(12) United States Patent
Ray

(10) Patent No.: US 11,947,898 B2
(45) Date of Patent: Apr. 2, 2024

(54) SYSTEM AND METHOD OF CONTENT BRIEF GENERATION USING MACHINE LEARNING

(71) Applicant: STORYROOM INC., Reno, NV (US)

(72) Inventor: Debajyoti Ray, Sparks, NV (US)

(73) Assignee: STORYROOM INC., Reno, NV (US)

( * ) Notice: Subject to any disclaimer, the term of this patent is extended or adjusted under 35 U.S.C. 154(b) by 0 days.

(21) Appl. No.: 17/219,783

(22) Filed: Mar. 31, 2021

(65) Prior Publication Data

US 2022/0318488 A1 Oct. 6, 2022

(51) Int. Cl.
 *G06F 40/137* (2020.01)
 *G06N 20/00* (2019.01)
 *G06Q 30/0241* (2023.01)

(52) U.S. Cl.
 CPC .......... *G06F 40/137* (2020.01); *G06N 20/00* (2019.01); *G06Q 30/0276* (2013.01)

(58) Field of Classification Search
 CPC ... G06F 40/137; G06N 20/00; G06Q 30/0276
 See application file for complete search history.

(56) References Cited

U.S. PATENT DOCUMENTS

| | | | |
|---|---|---|---|
| 7,630,976 B2 * | 12/2009 | Zhang | |
| 9,619,450 B2 | 4/2017 | Alfonseca et al. | |
| 9,678,618 B1 * | 6/2017 | Schrock | |
| 2002/0035486 A1 * | 3/2002 | Huyn | |
| 2012/0310990 A1 * | 12/2012 | Viegas | |
| 2014/0181646 A1 | 6/2014 | Rangwala et al. | |
| 2014/0372875 A1 * | 12/2014 | Sugibuchi | |
| 2018/0096067 A1 * | 4/2018 | Tober | |
| 2019/0266228 A1 * | 8/2019 | Sharma | |
| 2020/0210647 A1 | 7/2020 | Panuganty et al. | |
| 2020/0320249 A1 * | 10/2020 | Hwang | |
| 2021/0004582 A1 * | 5/2021 | Evans | |
| 2021/0149993 A1 * | 5/2021 | Torres | |

FOREIGN PATENT DOCUMENTS

| CN | 111260145 A | * | 6/2020 | ............. G06F 16/35 |
|---|---|---|---|---|
| CN | 111260145 A | | 6/2020 | |

OTHER PUBLICATIONS

"International Search Report," for PCT/US2022/022930, dated Jul. 7, 2022.
"Written Opinion of the International Search Authority," for PCT/US2022/022930, dated Jul. 7, 2022.
PCT International Preliminary Report on Patentability for PCT/US2022/022930, dated Oct. 12, 2023.

* cited by examiner

*Primary Examiner* — Scott T Baderman
*Assistant Examiner* — Mario M Velez-Lopez
(74) *Attorney, Agent, or Firm* — Womble Bond Dickinson (US) LLP

(57) ABSTRACT

A method and apparatus of a device for generating one or more content briefs is described. In an exemplary embodiment, the device receives a strategy for generating the plurality of content briefs, wherein each of the plurality of content briefs is a structured document that is used to guide creation of content. In addition, the device may collect a collection of content and generate a plurality of content clusters using unsupervised machine learning to cluster the content collection with the received strategy. Furthermore, the device may generate the plurality of content briefs from the plurality of content clusters.

20 Claims, 11 Drawing Sheets

US 11,947,898 B2

SYSTEM AND METHOD OF CONTENT BRIEF GENERATION USING MACHINE LEARNING

FIELD OF INVENTION

This invention relates generally to language processing and more particularly to content brief generation and headline generation using machine learning and/or natural language modeling.

BACKGROUND OF THE INVENTION

Large corporations or entities can utilize a public relations department to generate and disseminate information regarding this organization. The information can be the organization products, initiatives, services, and/or other activities provided by the organization and is disseminated by various channels (e.g., website, public relations release, social media, print media, etc.). The public department usually consists of a number of people that are tasked with generation of the content for the organization.

One type of information that a public relations department generates is a content brief. A content brief is a document outline created by the public relations department that a content creator uses to generate a piece of content. For example, a content brief can include a title, a topic, an intended audience, a suggested tone of voice for the content, a content purpose, a set of potential questions to guide the content generator, a set of relevant sources, and/or a set of possible influencers for this content. A content creator would then use the content brief as a guide to generate the content. A problem with the content brief is that these are laborious to produce. Because the content brief can involve a tremendous amount of research, a public relations department can generate 1-2 content briefs per week.

Furthermore, the generated content briefs need to be kept up to date and stay abreast of the numerous events that may or may not be relevant to a company or organization. This can be exceedingly difficult to do for manually generated content briefs due to the multitude of social media (and/or other media) changes and the volume of generated data.

In addition, to the content briefs, the public relations department would also generate headlines based on a strategy of the organization. These headlines are short sentences meant to grab the attention of the reader. Many thought leaders will decide to read or not read content based on the headline of that content.

SUMMARY OF THE DESCRIPTION

A method and apparatus of a device for generating one or more content briefs is described. In an exemplary embodiment, the device receives a strategy for generating the plurality of content briefs, wherein each of the plurality of content briefs is a structured document that is used to guide creation of content. In addition, the device may collect a collection of content and generate a plurality of content clusters using at least an unsupervised learning to cluster the content collection with the received strategy. Furthermore, the may generate the plurality of content briefs from at least the plurality of content clusters.

In another embodiment, a device that generates multiple headlines is described. In one embodiment, the device receives a strategy for generating the plurality of headlines, wherein each of the plurality of headlines is a document outline for content creation. In addition, the device may collect a collection of content and generate a plurality of content clusters using at least an unsupervised learning to cluster the content collection with the received strategy. Furthermore, the device may summarize each of to the plurality of content clusters to generate the plurality of headlines.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
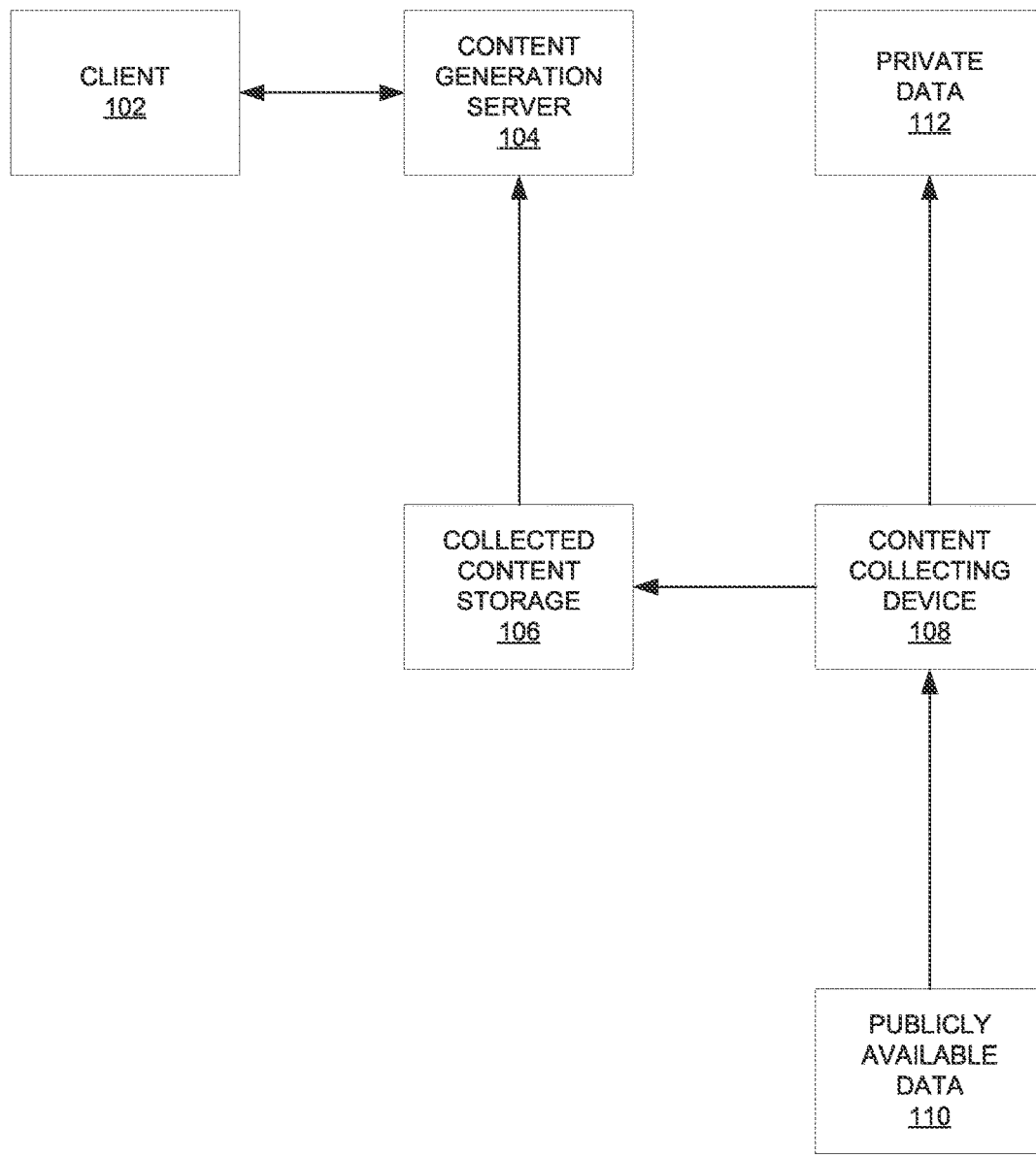
FIG. 1 is an illustration of one embodiment of a system that generates headlines and/or content briefs from collected content.

A method and apparatus of a device that generates one or more content briefs is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that generates one or more content briefs is described. In one embodiment, the device collects content based on an inputted strategy. In one embodiment, the strategy can be one or more of a topic, context, persona, channel, and/or a combination thereof. With the inputted strategy, the device collects content by crawling the internet for available content according to the strategy. In addition, the device stores the content.

Using the stored content, the device generates intent clusters, where each intent cluster is a set of content (e.g., documents, social media posts, video, transcribed audio, and/or other types of media) that is in response to a user's intended query to the system. The device further summarizes the intents and uses the summarized intent clusters to generate the headlines. In one embodiment, the headline is text that conveys the meaning of the content associated with the headline. In this embodiment, a headline needs to be salient and capture a reader's attention. A headline further needs to summarize the main point of the associated content, while making sense and be correct according grammar and other language conventions. A headline can make a different on whether content is opened and/or engaged by the reader. Many thought leaders may merely read headlines instead of the associated content.

Furthermore, the device generates the content briefs from the summarized intent clusters. In one embodiment, a content brief is a document outline created by the public relations department that a content creator uses to generate a piece of content.

FIG. 1 is an illustration of one embodiment of a system 100 that generates headlines and/or content briefs from collected content. In FIG. 1, system 100 includes a client 102 coupled to a content generation server 104. In one embodiment, the client 102 is coupled to the content generation server via data network (not illustrated). The content generation 102 is further coupled to the collected content 106. The collected content 106 is generated from the content collection device 108, where the content collection device 108 collects the content 108 collects the content from publically available data 110 and/or third party data 112 that maybe private (e.g., not publically available). In one embodiment, the client 102, content generation server 104, and content collecting device 108 are each independently a device that include a processing unit that is used to receive, transmit, and/or process the content (e.g., the device can be a personal computer, laptop, server, tablet, smart phone, and/or any type of device capable of processing content).

In one embodiment, the client 102 can request the generated content from the content generation server 104 using hypertext transfer protocol (HTTP) to request and/or retrieve the generated content. In this embodiment, the client 102 can request one or more content briefs and/or a set of headlines for a company or organization. As described above, a content brief is a document outline created by the public relations department that a content creator uses to generate a piece of content. For example, a content brief can include a title, a topic, an intended audience, a suggested tone of voice for the content, a content purpose, a set of potential questions to guide the content generator, a set of relevant sources, and/or a set of possible influencers for this content. A content creator would then use the content brief as a guide to generate the content. In addition, a problem with the content briefs is that these are manually generated by a public relations department, where each content brief can be laborious to produce. The reason that a content brief takes a long time to produce is that the content brief is that a large amount of content research is needed to generate the different content brief components (e.g., a title, a topic, an intended audience, a suggested tone of voice for the content, a content purpose, a set of potential questions to guide the content generator, a set of relevant sources, and/or a set of possible influencers) for a single content brief. Because the content brief can involve a tremendous amount of research, a public relations department can generate 1-2 content briefs per week.

Furthermore, the generated content briefs need to be kept up to date and stay abreast of the numerous events that may or may not be relevant to a company or organization. This can be exceedingly difficult to do for manually generated content briefs due to the multitude of social media (and/or other media) changes and the volume of generated data.

In one embodiment, it would be useful to have some automated procedure that can automatically generate content briefs for a company or organization, so that the public relations department can review the automatically generated content briefs and decide which of the content briefs are worth turning into the content for the that company or organization. In addition, and in one embodiment, headlines can be automatically generated for potential content briefs that assist a thought leader or other content decider in selecting a content brief to review. The public relations department would generate these headlines based on a strategy of the organization. Each of the headlines are short sentences meant to grab the attention of the reader. Many thought leaders may decide to read or not read content based on the headline of that content.

The content generation server 104, in one embodiment, generates the content briefs and/or headlines using a strategy that can be tailored for a particular company or organization. In one embodiment, the content generation device 108 generates the content briefs and/or headlines based on a strategy that is created by the particular company or organization that wishes to have the content briefs and/or headlines generated. In one embodiment, the strategy can include particular personas, topics, contexts, and/or channels that can be used to guide the collection of content for the content brief and/or headline generation. In this embodiment, one or more persona can include a person, personality, identity, organization, or another type of entity that are to be included in the content collection. For example, and in one embodiment, for a media company, persona can be different media people that review media, such as online bloggers, social media influencers, print media reviewers, etc. In a further embodiment, a topic can be a set of one of more subjects that are to be included in the content collection and/or to guide the content collection. For example, and in one embodiment, for the media company, content can be media in the same type of genre that this media company produces. In addition, contexts are a set of one or more contexts used for the content collection. For example, and in one embodiment, the term "trucks" can have different meaning depending companies and/or brand. In one example, if the campaign is related to truck manufacturer, Ford, the set of context is selected to be "pickup trucks", such as the Ford F-150. Alternatively, if the campaign is for Tesla, the context retrieved would be for "self-driving long haul or cargo trucks." To determine the context, in one embodiment, the system crawls the brand or campaign company's websites, brand books, and/or previous content to determine the context. In another embodiment, channels are a set of one more channels that are used for the content collection, where a channel is a media segment, such as a particular set of one or more website, media outlets, and/or other types of media segments. For example, and in one embodiment, for the media company, a channel can be website that covers the area regarding the media company, a social media presence, etc.

In one embodiment, the content strategy can be converted into a set of criteria that is used for the content collection. In this embodiment, the set of criteria can include one or more sources, keywords, filters, data ranges, and/or profiles, where a source is a Uniform Resource Locator (URL) or reference to a content source, a keyword is one or more words used for a keyword search, a filter is used to limit the retrieved content to a particular characteristic as indicated in the filter, data ranges limits the retrieve content generated or modified with a certain data range, and a profile limits the retrieved content to content that fits within the profile.

In this embodiment, the content generation device 108 uses this set of criteria when collecting the content for this strategy. In one embodiment, the content generation device 108 can collect different set of content for different companies or organizations, and/or collect multiple different content collections for the same company or organization. For example, and in one embodiment, a multi-national company can collect different content sets for different geographical regions, different subsidiaries, and/or different product/service lines.

In one embodiment, the content generation device 108 collects content using the set of criteria from publically available data 110 (e.g., publically available websites, databases, catalogs, and/or other types of publically data) and/or private data 112 (e.g., data private to the requesting company or organization, data behind a paywall, and/or other type of private data). The content generation device 108 stores the collected content in collected content storage 106. In one embodiment, the collected content storage 106 is a NoSQL database or another type of data store.

With the collected content, the content generation server 104 can use this collected content to generate the content briefs and/or headlines. In one embodiment, the content generation server 104 retrieves the collected content from the collected content storage and create intent clusters from the collected content. In this embodiment, an intent cluster is a set of content (e.g., documents, social media posts, video, transcribed audio, and/or other types of media) that is in response to a user's intended query to the system. In one embodiment, a user of the system searches with a goal or intention for a given subject (e.g., "IoT in Factories"). In this embodiment, the system responds with a set of documents, posts, etc. (in general content) on its summary. This set of content is an intent cluster. This can be in contrast from a keyword match search, where "IoT in Factories" will just return a set of documents containing that keyword or phrase. In this embodiment, an intent cluster considers a broader set associated with the input term(s), including variants such as different spellings, synonyms, related terms and/or other ways to expand a meaning of the input terms used for the intent cluster generation. In one embodiment, the content generation server creates the one or more intent clusters using unsupervised machine learning. Creating the intent clusters is further described in FIG. 8 below.

In one embodiment, the content generation server 104 can generate a set of headlines from the one or more intent clusters. In this embodiment, the content generation server 104 generates the headlines by summarizing each of the intent clusters with input from the content, persona, and channels of the strategy. In one embodiment, the content generation server 104 can generate one or more headlines from one of the intent clusters and/or generate multiple headlines from multiple intent clusters. Generating headlines is further described in the FIG. 6 below. In addition, and in one embodiment, the content generation server 104 can generate one or more content briefs from the intent cluster(s). In this embodiment, the content generation server 104 uses a classifier to classify each of the intent clusters and generate a tone of voice, audience type, and day of publication for a content brief. In addition, the content generation server 104 can estimate characteristics for each of the content briefs, such as demand, exclusivity, and emotionality. In this embodiment, demand is an estimation of a popularity that could be for the content brief, exclusivity is an estimate for uniqueness of the content brief, and emotionality is an estimate for a degree of emotion the content brief may invoke. Generating a content brief is further described in FIG. 7 below. In one embodiment, the content generation server 104 can generate the content briefs much more quickly than done by the public relations department as described above. For example, and in one embodiment, the content generation server 104 can generate one ore mote content briefs in minutes or less. This allows the public relations department to generate a greater number of content briefs for different content creators. In addition, content briefs can be updated (e.g., just by re-generating the content briefs), which would be difficult to impossible as done manually by the public relations department.

While in one embodiment, one client 102 is illustrated requesting content briefs and/or headlines from the content generation server 104, in alternate embodiments, there can be more than one client 102 requesting content briefs and/or headlines from the content generation server 104. In addition, and in an alternative embodiment, the content generations server 102 can performs the functions of the content generations server 102 and the content collection device 108. Furthermore, each of the content generations server 102 and the content collection device 108 can separately be one or more devices.

Figure 2:
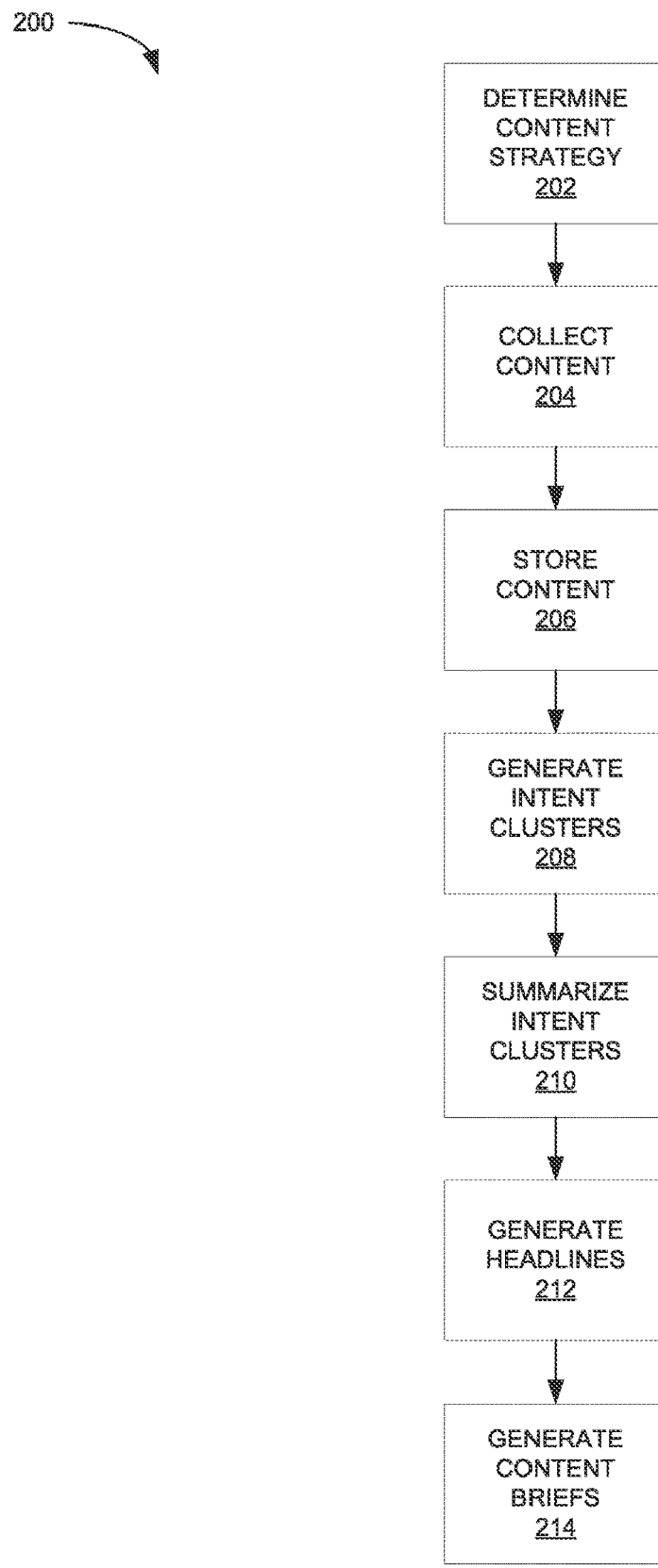
FIG. 2 is a flow diagram of one embodiment of a process to generate headlines and/or content briefs.

As per above, the content generation server 104 can generate one or more content briefs and/or headlines based on an input strategy. FIG. 2 is a flow diagram of one embodiment of a process 200 to generate headlines and/or content briefs. In one embodiment, a content generation server and/or content collection device can perform one or more of the steps to generate headlines and/or content briefs, such as the content generation server 104 and/or content collection device 108 as described in FIG. 1 above. In FIG. 2, process 200 begins by determining a content strategy at block 202. In one embodiment, a content strategy is a strategy that is used to guide the content collection for the content brief and/or headline strategy. In this embodiment, there one content strategies that are used for each content collection, where a strategy can include indications for personas, topics, content, and/or channels that can be used to guide the collection of content for the content brief and/or headline generation. In this embodiment, one or more persona can include a person, personality, identity, organization, or another type of entity that are to be included in the content collection. For example, and in one embodiment, for a media company, a persona can be one or more different media people that review media, such as online bloggers, social media influencers, print media reviewers, etc.). In a further embodiment, topics can be a set of one of more subjects that are to be included in the content collection and/or to guide the content collection. For example, and in one embodiment, for the media company, content can be media in the same type of genre that this media company produces. In addition, contexts are a set of one or more contexts used for the content collection. In one embodiment, the term can have different meaning based on the context of how the term is being used. For example, and in one embodiment, the term "trucks" can have different contexts depending on the user or brand involved. If the campaign is related to Ford, the set of context is related to "pickup trucks" such as the Ford F-150. Alternatively, if the campaign is for Tesla, the context retrieved is for "self-driving long haul or cargo trucks." To retrieve the context, the system crawls the brand or campaign company websites, brand looks, and previous contexts to clarify the context. In another embodiment, channels are a set of one more channels that are used for the content collection, where a channel is a media segment, such as a particular set of one or more website, media outlets, and/or other types of media segments. For example, and in one embodiment, for the media company, a channel can be websites that cover the area regarding the media company, social media presences, etc.

At block 204, process 200 collects the content. In one embodiment, process 200 collects the content using the determined strategy. For example, and in one embodiment, process 200 can utilize a web crawler to collect content using the determined strategy. Process 200 stores the collected content at block 206. In one embodiment, process 200 stores the collected content in a NoSQL database or another type data store that allows access to the collected content. At block 208, process 200 generates one or more intent clusters. In one embodiment, an intent cluster is a set of content (e.g., documents, social media posts, video, transcribed audio, and/or other types of media) that is in response to a user's intended query to the system. In this embodiment, each of the intent clusters can be generated using an unsupervised machine learning process as described in FIG. 8 below. In one embodiment, process 200 generates the intent cluster processing the collected content with a trained auto-encoder that takes the documents from the collected content and corresponding types for these documents and outputs a lower dimension representation of the documents. Process 200 further clusters the lower dimension representation of the documents to generate the intent clusters. Generating the intent clusters is further described in FIG. 8 below.

In one embodiment, each of the intent clusters includes a sub-collection of the collected content. Process 200 summarizes each intent cluster at block 210. In one embodiment, process 200 summarizes an intent cluster by using an Attention Encoder Recurrent Neural Network as described in FIG. 6 below. At block 212, process 200 generates the one or more headlines from the summarized intent clusters. In one embodiment, process 200 generates the headlines by summarizing each of the intent clusters with input from the content, persona, and channels of the strategy. In one embodiment, the process 200 can generate one or more headlines from one of the intent clusters and/or generate multiple headlines from multiple intent clusters. Generating headlines is further described in the FIG. 6 below.

Process 200 generates one or more content briefs at block 214. In one embodiment, process 200 generates one or more content briefs from the intent cluster(s). In this embodiment, process 200 uses a classifier to classify each of the intent clusters and generate a tone of voice, audience type, and day of publication for a content brief. In addition, process 200 can estimate characteristics for each of the content briefs, such as demand, exclusivity, and emotionality. In this embodiment, demand is an estimation of a popularity that could be for the content brief, exclusivity is an estimate for uniqueness of the content brief, and emotionality is an estimate for a degree of emotion the content brief may invoke. Generating a content brief is further described in FIG. 7 below.

Figure 3:
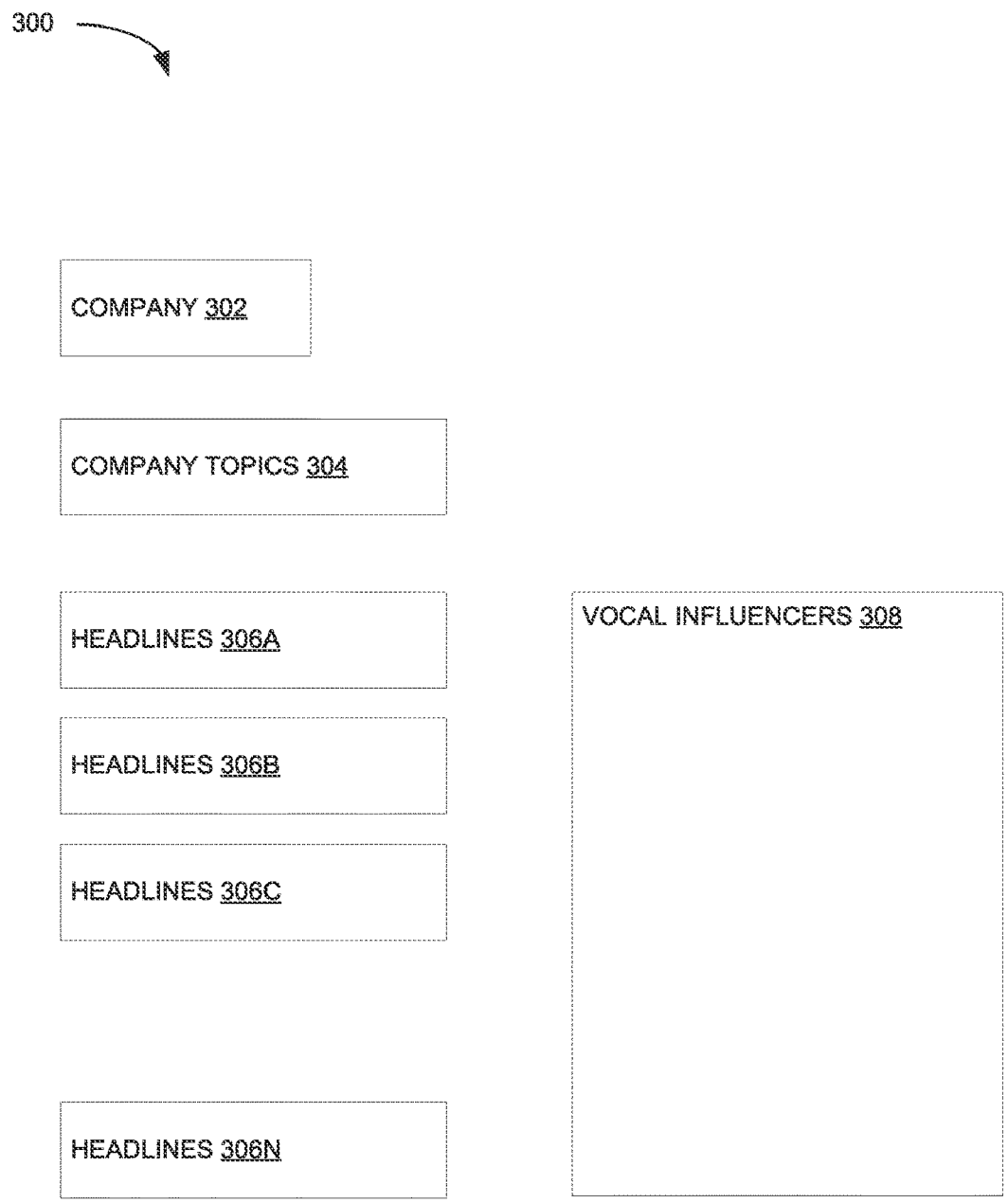
FIG. 3 is a block diagram of one embodiment of a user interface presenting headlines.

As described above, a client can request the content briefs and/or the headlines. In one embodiment, the client is presented with a dashboard that presents an organization names, topics, vocal influencers, and;/or a set or one or more headlines. A user can use this dashboard to read and review the generated headlines and as a springboard to access a content brief associated with one of the headlines. FIG. 3 is a block diagram of one embodiment of user interface 300 presenting headlines. In FIG. 3, the user interface 300 includes a company name 302, company topics 304, one or more headlines 306A-N, and vocal influencers 308. In one embodiment, the company name 302 is the company name (or organization name, entity name, etc.). The company topics 304 represents one or more topics associated with the company (or organization, entity, etc.). Headlines 306A-N represent a set of headlines associated with the company (or organization, entity, etc.). Each headline 306A-N can include the headline text, and headline characteristics. The headline user interface is further described in FIG. 4 below. Vocal influencers 308 is a listing of vocal influencers associated with the company.

Figure 4:
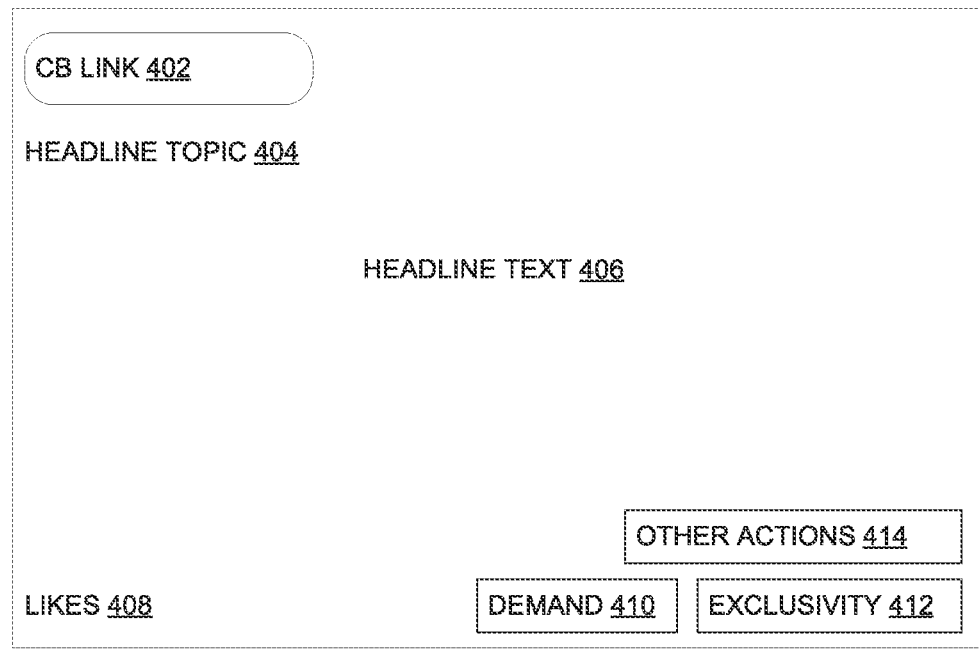
FIG. 4 is a block diagram of one embodiment of a user interface presenting a headline.

FIG. 4 is a block diagram of one embodiment of user interface presenting an individual headline. In FIG. 4, the headline user interface 400 includes a content brief link 402, which when activated, leads to a content brief user interface for a content brief associated with this headline. The headline user interface 400 further includes headline topic 404, headline title 406, headline characteristics (e.g., likes 408, demand 410, exclusivity 412), and other actions 414. In one embodiment, the headline topic 404 and headline text 406 includes a topic and text associated with the headline. In this embodiment, the headline is text that conveys the meaning of the content associated with the headline. In one embodiment, a headline needs to be salient and capture a reader's attention. A headline further needs to summarize the main point of the associated content, while making sense and be correct according grammar and other language conventions. In addition, the headline can include one or more characteristics. Headline likes 408 indicates that number of likes this headline has. The demand 410 and exclusivity 412 headline characteristics are each an estimate of the demand or exclusivity for a headline. Furthermore, the headline user interface can include other actions 414 (e.g., Likes, Show Statistics, Send to Content Management System (CMS) or Workflow Tool, Application Programming Interface (API) access, and/or other actions).

Figure 5:
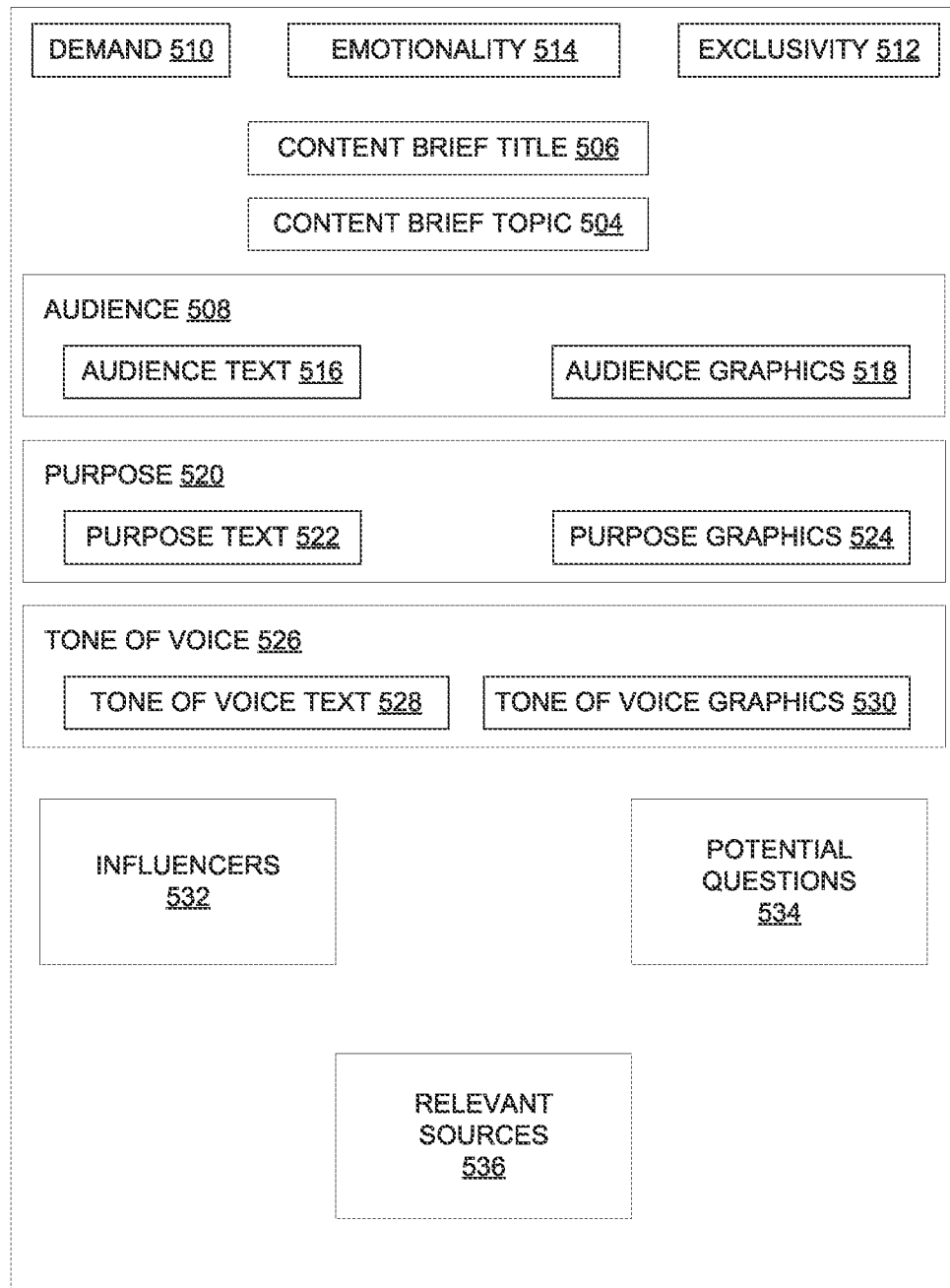
FIG. 5 is a block diagram of one embodiment of a user interface presenting a content brief for a company.

In one embodiment, by clicking on the content brief link, a user can access the content brief associated with a headline. While in one embodiment, the content brief is accessed through a link associated with a headline, in alternate embodiment, access to the content brief can be through other means (e.g., a web page that lists the content briefs, etc.). FIG. 5 is a block diagram of one embodiment of user interface presenting a content brief 500 for a company. In FIG. 5, the content brief user interface 500 includes a content brief title 506, content brief topic 504, and content brief text 502, where the content brief title 506 is a title for the content brief, content brief topic 504 is a topic associated with the content brief, and the content brief text 502 is other text associated with the content brief. In addition, the content brief includes characteristics: demand 510, emotionality 514, and exclusivity 512. In one embodiment, demand is an estimation of a popularity that could be for the content brief, exclusivity is an estimate for uniqueness of the content brief, and emotionality is an estimate for a degree of emotion the content brief may invoke. The content brief user interface 500 further includes one or more of the other components of the content brief: audience 508, purpose 520, tone of voice 526, influencers 532, potential questions 534, and relevant sources 536.

In one embodiment, the audience 508 is an intended audience for the content brief. In this embodiment, the audience 508 includes audience text 516, In this embodiment, the audience text 516 includes text for describing the suggested type of audience for the content to be generated form the content brief. For example, and in one embodiment, an audience type can be an early adopter, innovator, mainstream, and/or another type of audience. In addition, the audience text can describe the audience type, so as to give cues to the content generator. The audience 508 can further include an audience graphic 518 that visually indicates the suggested audience type. In one embodiment, the audience 508 is an advertising segment, such as a Nielsen demographic.

In a further embodiment, the content brief user interface 500 includes a purpose 520, where the purpose is a suggested purpose for the content generated form the content brief. In this embodiment, the purpose 520 includes purpose text 522, where the purpose text 522 includes text for describing the suggested type of purpose for the content to be generated form the content brief. For example, and in one embodiment, a purpose type can be an entertain, educate, convince, inspire, and/or another type of purpose. In addition, the purpose text can describe the purpose type, so as to give cues to the content generator. The purpose 508 can further include a purpose graphic 524 that visually indicates the suggested purpose type.

In another embodiment, the content brief user interface includes a tone of voice 526, where the tone of voice is a suggested tone of voice for the content generated from the content brief. In this embodiment, the tone of voice 526 includes tone of voice text 528, where the tone of voice text 528 includes text for describing the suggested type of tone of voice for the content to be generated from the content brief. For example, and in one embodiment, a tone of voice type can be an enthusiastic, matter of fact, irreverent, casual, formal, and/or another type of tone of voice. In addition, the tone of voice text can describe the tone of voice type, so as to give cues to the content generator. The tone of voice 526 can further include a tone of voice graphic 530 that visually indicates the suggested tone of voice type.

In addition, and in one embodiment, the content brief 500 can include influencers 532, potential questions, and/or relevant sources 536. In this embodiment, influencers 532, potential questions 534, and relevant sources 536. In this embodiment, the influencers 532 is a set of one or more influencers that are relevant for this content brief. The influencers can a reference to a social media account of the influencer, web site, author page, company profile page, and/or other types of influencer content. In a further embodiment, potential questions 534 is a set of questions that a content generator can use when generating the content. In a further embodiment, relevant sources are a set of one or more sources that could be relevant to the content generator when generating the content associated with the content brief. For example, and in one embodiment, each of the relevant source can be a URL, a reference to written media, and/or some other reference to a source.

Figure 6:
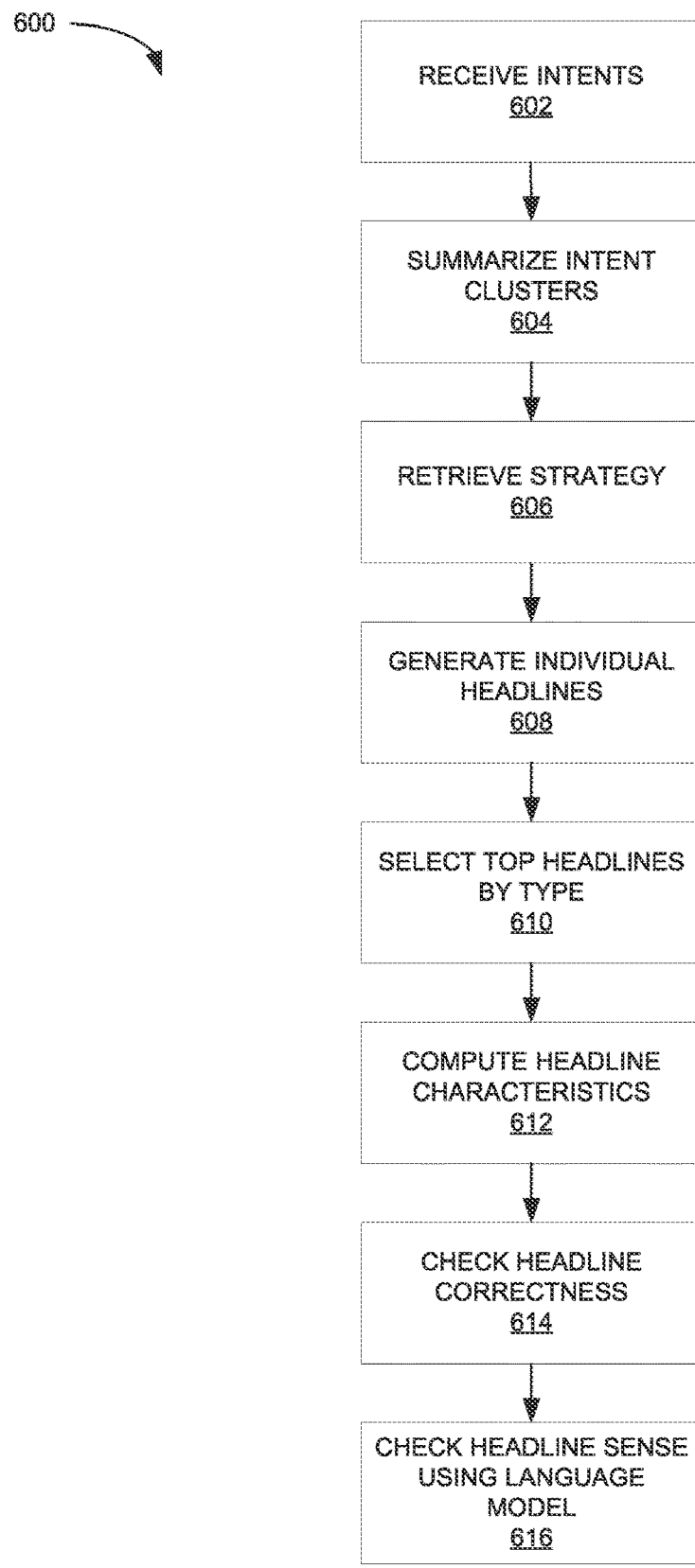
FIG. 6 is a flow diagram of one embodiment of a process to generate headlines.

FIG. 6 is a flow diagram of one embodiment of a process 600 to generate headlines. In one embodiment, process 600 is performed by a process to generate the headlines, such as process 200 at block 212 as described in FIG. 2 above. In FIG. 6, process 600 begin by receiving the intent clusters at block 602. In one embodiment, an intent cluster is a set of content (e.g., documents, social media posts, video, transcribed audio, and/or other types of media) that is in response to a user's intended query to the system. At block 604, process 600 summarizes the intent clusters. In one embodiment, process 600 summarizes the intents using an Attention Encoder Recurrent Neural Network as described below. Process 600 retrieves the strategy at block 606. In one embodiment, the strategy can include context, persona, and/or channels, which can also be used for content collection.

At block 608, process 600 generates the individual headlines. In one embodiment, process 600 receives the intent document corpus, which is the output of the intent clustering process as described in FIG. 9 below. In this embodiment, process 600 generates N candidate headlines by using an encoding attentive recurrent neural network scheme. The output of this scheme can be candidate headlines such as "10 Best Investing Techniques," "Optimal Yields of Investments," etc. Process 600 scores each candidate headline using a saliency model to give a set of scores for each candidate headline. For example, and in one embodiment, a headline, $y^{(1)}$ can have a set of scores $\{s^{(1)}, s^{(2)}, \ldots, s^{(n)}\}$, where each $s^{(i)}$ is an individual score output by the saliency model. The saliency model is described below.

Figures 10A, 10B:
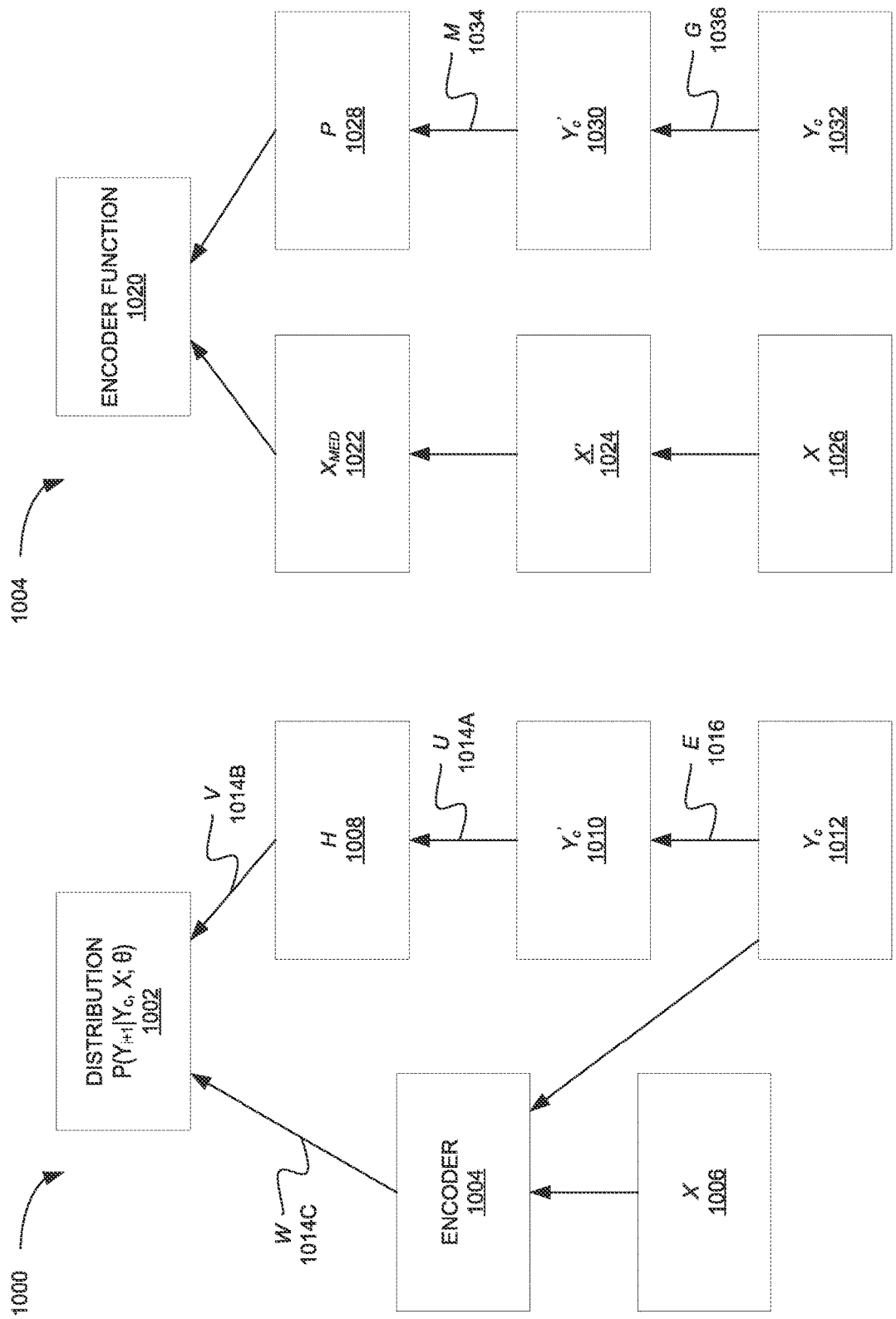
FIG. 10A is a block diagram of one embodiment of a feedforward neural network with an encoder.
FIG. 10B is a block diagram of one embodiment of an encoder for the feedforward neural network.

In one embodiment, the encoding attentive recurrent neural network model is a model that is used to generate the N candidate headlines. In this embodiment, process 600 uses this model with a vocabulary of words or tokens (e.g., n-grams) V that includes an end of sentence indicator <eos>. Each word is an indicator vector $i \in \{0,1\}^V$ for each $i \in \{1, \ldots, M\}$. A document of text is a sequence of indicators. The text of an intent is $\vec{X} = \{t_1, t_2, \ldots t_N\}$. The output of the text of the intent is a headline, which is a shortened sequence, Y. In a further embodiment, a headline objective $f^1$ is: $\arg(\max(s(t,y)))$ for each $y \in Y$. In turn, the relatively best headline, y, for an intent x is the solution of this equation. The model distribution is $P(y_{i+1}|x_i, y_c; \theta)$, where $\theta$ is are the hyperparameter(s) of the model. In this embodiment, P is the conditional language model based on an input intent x. The distribution is parametrized by a Neural Network. In one embodiment, the neural network includes both a probabilistic language model and an encoder. The encoder acts as a conditional summary and the language model is a feedforward neural network. This neural network is further illustrated in FIG. 10A, which is a block diagram of the feedforward neural network 1000 that includes an encoder. In FIG. 10A, the feedforward neural network 1000 includes a distribution 1002 of P that is $P(y_{i+1}|x_i,y_c; \theta)$ and parameters E, U, V, and W, where E is the word embedding matrix and U, V, and W are weighted matrices. In one embodiment, the distribution 1002 is represented by the function $P(y_{i+1}|x_i, y_c; \theta) \propto \exp(V_h + W_{enc}(x, y_c))$. The distribution 1002 is fed by the weighted output matrix $W_{enc}$ 1014C and the output of the encoder 1004. In one embodiment, the encoder 1004 is an attention-based model that is described further in FIG. 10B below. The encoder 1004 is fed by x 1006 and $y_c$ 1012, which are intent corpus and the candidate headline, respectively. In addition, $y_c$ 1012 is operated on by the word embedding matrix E 1016 that results is $y_c'$ 1010, where $y_c' = [Ey_{i-c+1}, \ldots, Ey_i]$. $y_c'$ 1010 is then operated on by a weighted matrix U 1014A that results in h 1008, where $h = \tan h(U y_c')$ and is the size of the hidden layer H. Furthermore, h 1008 is operated on by another weighted matrix V 1014B and this output is fed into the distribution 1002.

As described above, the feed forward neural network 1000 includes an encoder 1004. FIG. 10B is a block diagram of one embodiment of an encoder for the feedforward neural network. In FIG. 10B, the encoder 1004 includes an encoder function 1020 that implements the attention-based model. In one embodiment, the encoder function 1020 extends a Bag of words model by using a learned soft alignment, P, between the input and the summary. In one embodiment, the encoder function 1020, $\text{Enc}(x, y_c) = P^T x_{med}$, where $x_{med}$=the median of x' and x' (1024) is a weighted array of x (1026) values, where $x' = [Fx_1, \ldots, Fx_M]$ and $x = [x_1, \ldots, Fx_M]$. In addition, P (1028) varies with the exponential of x' and $y_c'$. In particular, $P \propto \exp(x' M y_c')$, where $y_c' = [Gy_{i-c+1}, \ldots, Gy_i]$ and G is an embedding matrix of the context and M is a weight matrix mapping context and input embedding.

In one embodiment, the Attention Encoder Recurrent Neural Network is trained on a dataset of $(x^{(1)}, y^{(1)}), \ldots, (x^{(J)}, y^{(J)})$, where each training data point is a document corpus $x^{(i)}$ and headline $y^{(i)}$. In one embodiment, the training corpus is collected from media publications and other corpus like DUC, publically available training corpus. For training the model, a mini-batch gradient descent on the negative log likelihood is used. For example, and in one embodiment, to train the weights and parameters, a negative log likelihood is:

$$NLL(\theta) = -\sum_{j=1}^{J} \log p(y^{(j)} | x^{(j)}; \theta)$$

Returning to FIG. 6, process 600 generates the candidate headlines by solving $$y^* = \arg\max_{y \in Y} \sum_{i=0}^{N-1} g(y_{i+1}, x, y_c)$$

In one embodiment, this function can be approximated if the vocabulary is large. While in one embodiment, a greedy function may not work well and beam-search optimizations can lead to non-interesting sentences, in alternate embodiments, a top-p sample can be used to generate the sequence of words that can be used for candidate sentences. In the top-p sample, the next word can be picked randomly using a probability weight of $y_t \sim P(y|y1;t-1)$ If $y_t = \text{<eos>}$, the sentence stopes and the candidate headline is output. In one embodiment, this probability weight is assigned over all words on the in the vocabulary, which can lead to inconsistency and unnecessary computation. In a further embodiment, a set of words are chosen where the cumulative probability exceeds a threshold, P. For example, and in one embodiment, is the initial words chosen for the headline are "The" and "car" (in that order), looking for a word where the sum of the probability is equal to or greater than 0.97. The example equation would be:

$$\sum_{w \in V_{top-p}} P(w | \text{"The," "car"}) = 0.97$$

As described above, process 600 scores each candidate headline using a saliency model. In one embodiment, process 600, for each headline y, and for an intent x, is given a score using a Mixture of Experts saliency model for each of the types in the intent, x. In this embodiment, process 600 assigns a score for each headline y for a type t, where a type t is the set of parameters in the intent that is not text. For example, a type can be channel, persona, tone, purpose, emotionality, etc. As an example, and an embodiment, the sentence "10 Best Ways to Invest in in Stocks" has a different score if Type={Channel="Reddit," Persona="Novice Investor," Tone="Casual"} that Type=Channel="Wall Street Journal," Persona="Venture Capitalist," Tone="Formal"}. In this embodiment, the saliency model, $S(y,t) = S(y^1, t^1, \ldots, t^h)$ where $(t^1, \ldots, t^h)$ is each type attribute. In one embodiment, the output of the saliency model is a Mixture of Experts, where each expert if a particular type attribute.

In one embodiment, the training of the Mixture of Experts is using a training set $(s^{(1)}, y^{(1)}), \ldots, (s^{(m)}, y^{(m)})$ from the sets of articles, posts, comments, etc., from different channels, personas, and other type attributes.

Process 600 selects the top headlines by type at block 610. In one embodiment, the top scoring headline for each intent type is used in the Content Brief. At block 612, process 600 compute the headline characteristics. In one embodiment, a headline characteristic can be demand, exclusivity, or emotionality. In one embodiment, demand is an estimation of a popularity that could be for the headline, exclusivity is an estimate for uniqueness of the co headline, and emotionality is an estimate for a degree of emotion the headline may invoke. Process 600 checks a headline correctness for each headline at block 614. In one embodiment, process 600 checks the correctness of the headline by examining the grammar and consistency of the headline. In one embodiment, process 600 uses a generic grammar and sentence composition checking software, a publicly available API such as Grammarly, and/or another type of grammar or sentence checking mechanism. At block 616, process 600 checks the headline sense using a language model for each of the headlines.

Figure 7:
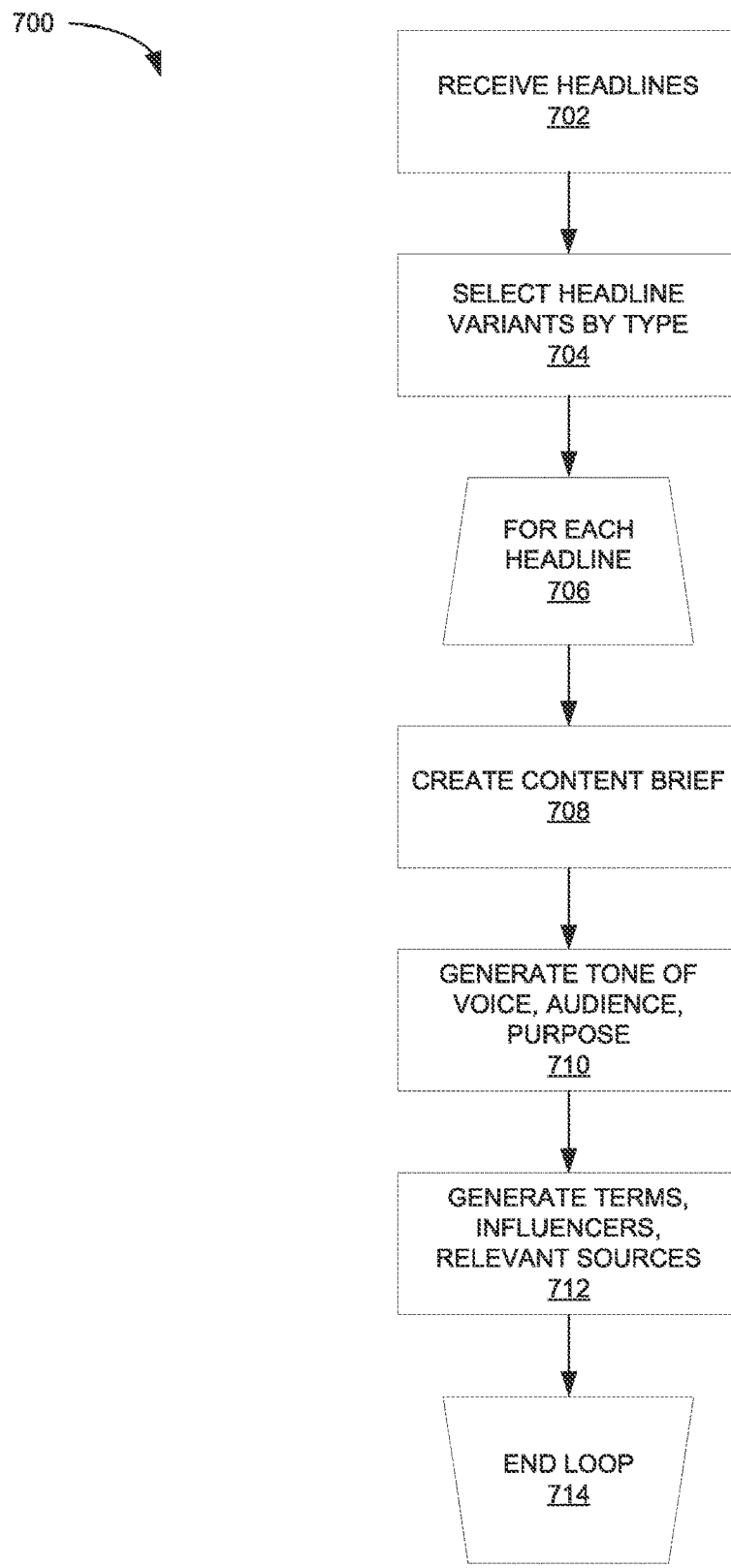
FIG. 7 is a flow diagram of one embodiment of a process to generate a content brief.

FIG. 7 is a flow diagram of one embodiment of a process 700 to generate a content brief. In one embodiment, process 700 is performed by a process to generate the headlines, such as process 200 at block 214 as described in FIG. 2 above. In FIG. 7, process 700 begin by receiving the headlines at block 702. At block 704, process 700 selects headline variants by type. In one embodiment, process 700 selects the top N headlines for each of the headline types.

Process 700 performs a processing loop (blocks 706-716) to generate content briefs from the individual headlines. At block 708, process 700 creates a content brief from the headline. In one embodiment, the content brief uses a template as a base for the content brief generation. In one embodiment, process 700 creates a basic template based on general public relations industry standards and requirements (e.g. what brands and clients look for). This can evolve as industry requirements of a client's needs change. In one embodiment, the content brief title is the headline text. Process 700 generates the tone of voice, audience, and/or purpose for the content brief at block 710. In one embodiment, process 700 uses one or more machine learning classifiers to generate the tone of voice, audience, and/or purpose for the content brief. In one embodiment, the tone of voice, audience, and/or purpose can each be an output of a classifier, such as a random forest classifier that takes as input the set of text as features and outputs those variables. The classifier can be trained on a training set of known content briefs. At block 712, process 700 generates terms, influencers, relevant sources, and/or questions. In one embodiment, process 700 can obtain the terms, influencers, and/or relevant sources from the clusters of documents that are part of the intent cluster. In a further embodiment, the terms, influencers, and/or relevant sources are pointers or links to public data or social media profiles. In another embodiment, process 700 generates the questions using natural language generation. In this embodiment, process 700 can use similar methods to generate the questions as is used for headline generation. The processing loop ends at block 714.

Figure 8:
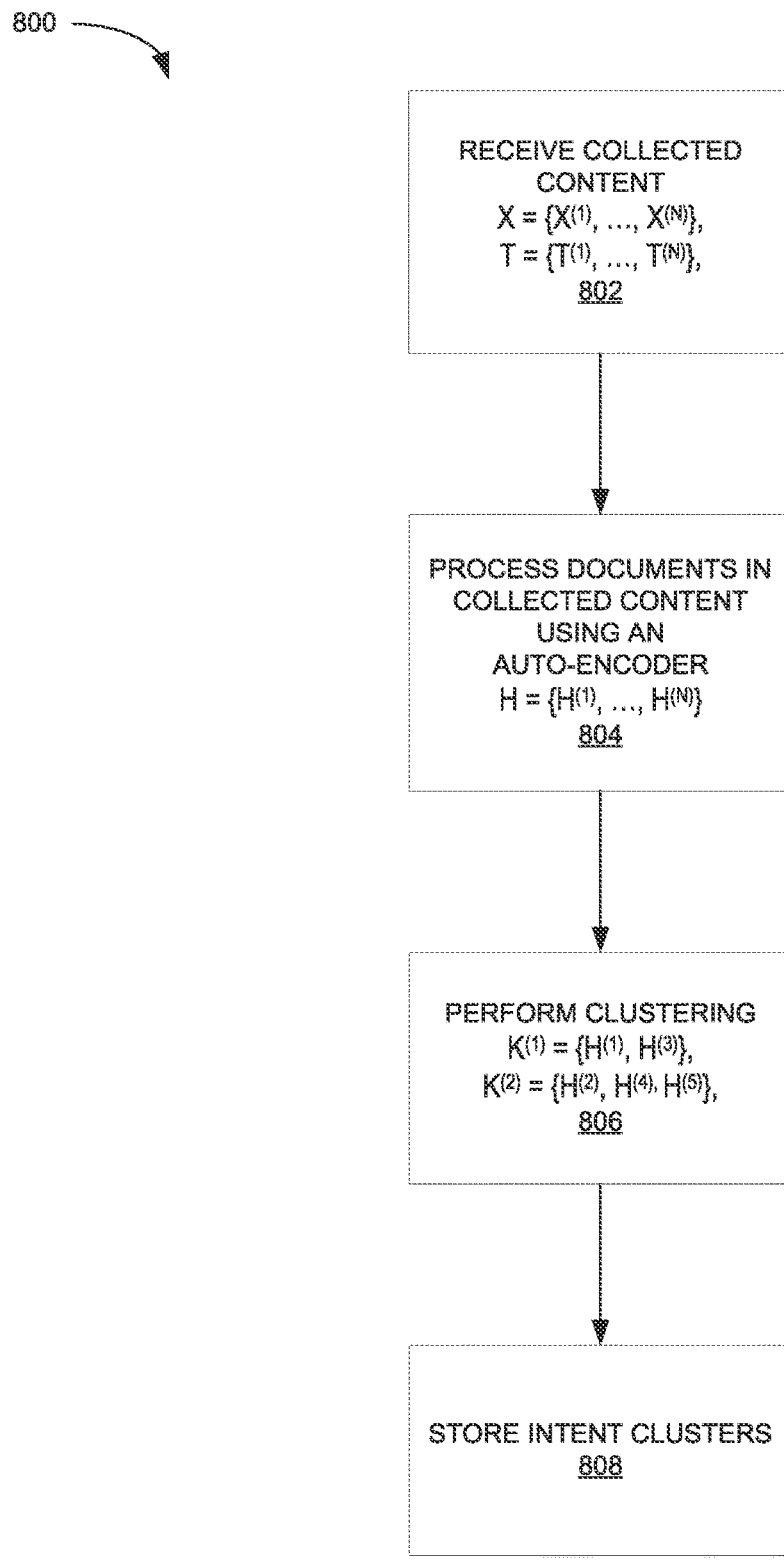
FIG. 8 is a flow diagram of one embodiment of a process to generate an intent cluster.

FIG. 8 is a flow diagram of one embodiment of a process to generate an intent cluster. In one embodiment, process 800 is performed by a process to generate the intent clusters such as process 200 at block 208 as described in FIG. 2 above. In FIG. 8, process 800 begin by receiving the collected content at block 802. In one embodiment, the collected content includes a set of documents $X=\{x^{(1)}, x^{(2)}, \ldots, x^{(m)}\}$, where the set of documents is associated with a set of types $T=\{t^{(1)}, t^{(2)}, \ldots, t^{(m)}\}$. In this embodiment, a document can be a web page, a social media post, word processing document, text, image, metadata, and/or any type of electronic object that includes text. In one embodiment, a type is a set of one more individual types that are characteristics of a document. In this embodiment, an individual type can be general metadata.

At block 804, process 800 processes the documents in the set of documents with an auto-encoder to determine features of the documents. In one embodiment, an auto-encoder is an unsupervised learning technique used in machine learning. In this embodiment, an encoder of the auto-encoder compresses the input features of the set of documents in successive layers by limiting the number of nodes in the encoder hidden layers. In the decoder layers of the auto-encoder, the number of nodes are decompressed in each successive hidden layer to reconstruct the original input to form the encoded state of the set of documents. With the set of documents and corresponding types (e.g., $X=\{x^{(1)}, x^{(2)}, \ldots, x^{(m)}\}$ and $T=\{t^{(1)}, t^{(2)}, \ldots, t^{(m)}\}$), process 800 uses the auto-encoder to generate a lower-dimensional representation $h^{(1)}$ for each document in the hidden layer. processed into a lower dimensional representation of the documents, the set of encoded features (e.g., $H=\{h^{(1)}, h^{(2)}, \ldots, h^{(m)}\}$. Thus, in this embodiment, process 800 maps $\{x^{(1)}, x^{(2)}, \ldots, x^{(m)}\}$ to a lower dimensional representation $\{h^{(1)}, h^{(2)}, \ldots, h^{(m)}\}$ with the type $\{t^{(1)}, t^{(2)}, \ldots, t^{(m)}\}$. The auto-encoder structure is further described in FIG. 9 below. In one embodiment, process 800 generates a set of encoded features corresponding to the set of documents.

Process 800 performs clustering using the set of encoded features at block 806. In one embodiment, process 800 uses k-means clustering to cluster the set of encoded features, $\{h^{(1)}, h^{(2)}, \ldots, h^{(m)}\}$. In this embodiment, process 800 clusters the encoded features based on K-means based similarity or anther distance based metric. For example, and in one embodiment, process 800 can generate a cluster with the form of $K^{(1)}=\{h^{(1)}, h^{(3)}\}\{t^{(1)}, t^{(3)}\}$, where $h^{(i)}$ is the particular encoded feature and $t^{(i)}$ is the corresponding type for that feature. Another example of a cluster is $K^{(2)}=\{h^{(2)}, h^{(4)}, h^{(5)}\}\{t^{(2)}, t^{(4)}, t^{(5)}\}$. At block 808, process 800 stores the intent clusters. In addition, process 800 can relate the original documents to $h^{(i)}$ so that documents $x^{(i)}$ is part of the clusters that includes $h^{(i)}$.

Figure 9:
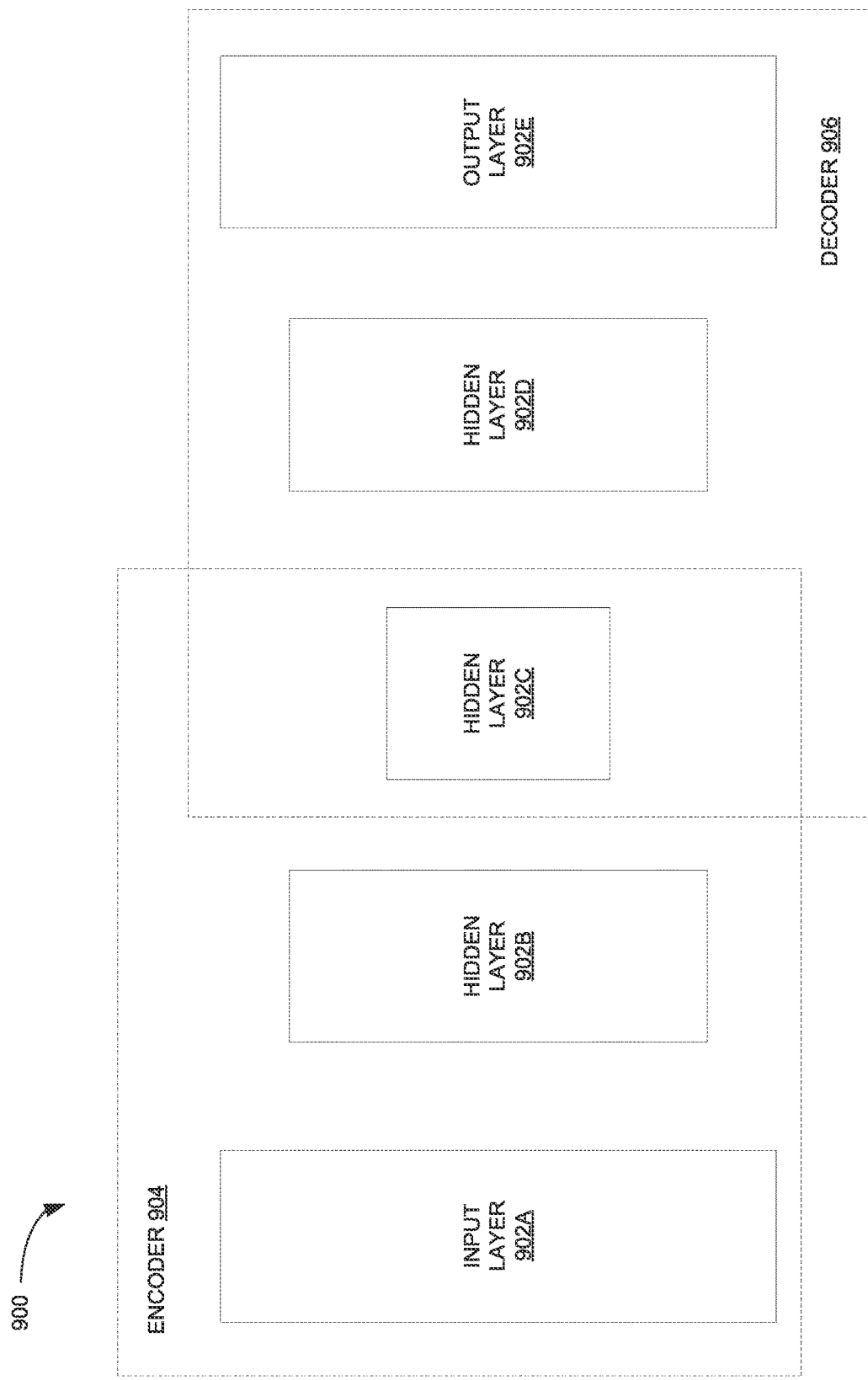
FIG. 9 is a block diagram of one embodiment of an auto-encoder that generates a lower dimension representation of a set of documents.

FIG. 9 is a block diagram of one embodiment of an auto-encoder 900 that generates a lower dimension representation of a set of documents. In one embodiment, an auto-encoder 900 is an unsupervised learning technique used in machine learning and includes an encoder 904 and decoder 906. Each of the encoder 904 and decoder 906 includes a subset of layers 902A-E. In this embodiment, the encoder 904 compresses the input features of the set of documents in the input layer 902A and in successive layers 902B-C by limiting the number of nodes in the encoder hidden layers 902B-C. In FIG. 9, the encoder hidden layers 902B-C each have smaller numbers of nodes as compared with the preceding layer. At the smallest layer (here, layer 902C), the decoder 906 successively decompresses the input features, where each successive layer 902C-E in the decoder 906 decompresses the features in the previous layer. In one embodiment, decoder 906 reconstructs the original input to form the encoded state of the set of documents in the output layer 906E.

Figure 11:
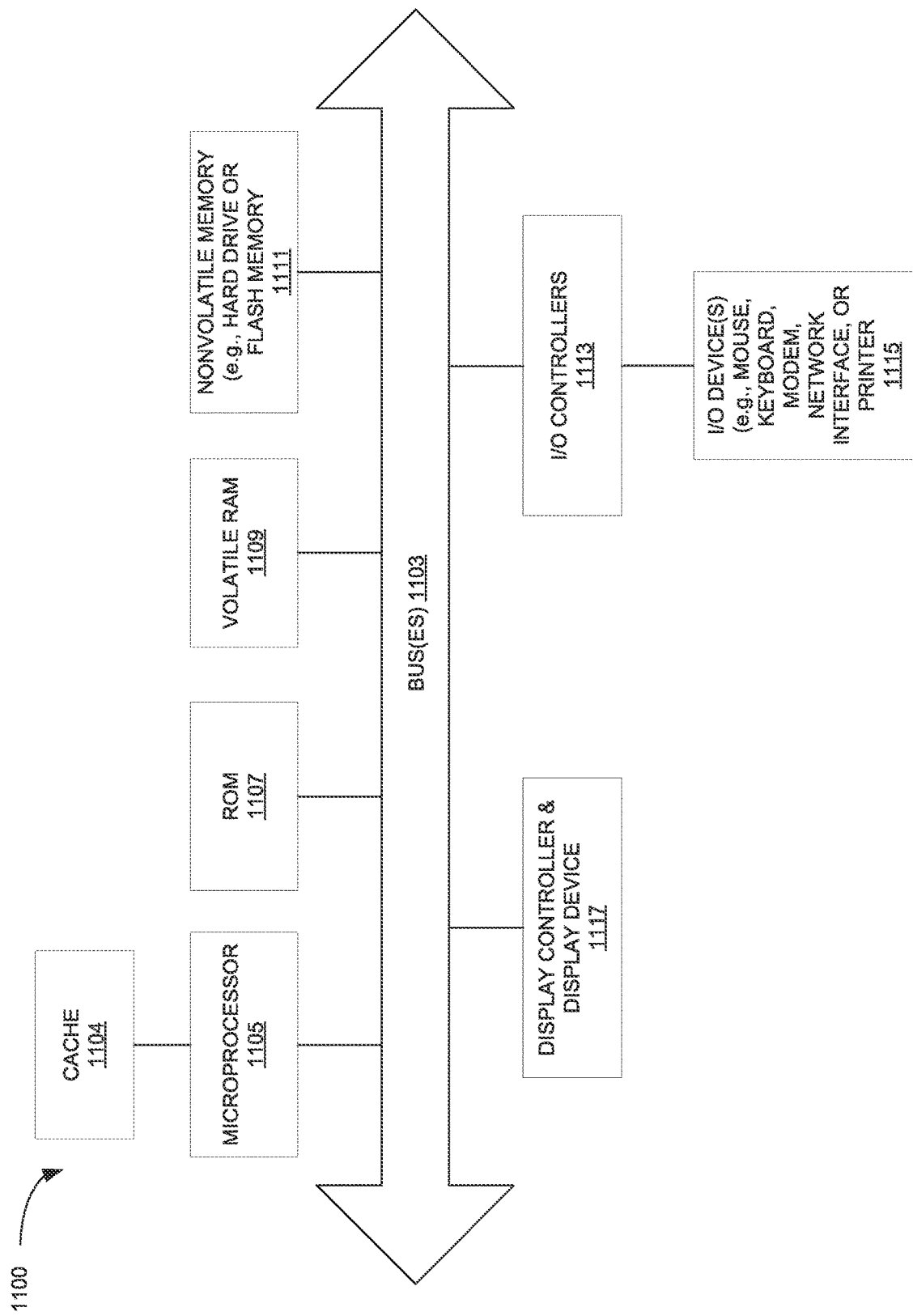
FIG. 11 illustrates one example of a typical computer system, which may be used in conjunction with the embodiments described herein.

FIG. 11 shows one example of a data processing system 1100, which may be used with one embodiment of the present invention. For example, the system 1100 may be implemented as a system that includes a content generating server as shown in FIG. 1 above. Note that while FIG. 11 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 11, the computer system 1100, which is a form of a data processing system, includes a bus 1103 which is coupled to a microprocessor(s) 1105 and a ROM (Read Only Memory) 1109 and volatile RAM 1109 and a non-volatile memory 1111. The microprocessor 1105 may include one or more CPU(s), GPU(s), a specialized processor, and/or a combination thereof. The microprocessor 1105 may retrieve the instructions from the memories 1109, 1109, 1111 and execute the instructions to perform operations described above. The bus 1103 interconnects these various components together and also interconnects these components 1105, 1109, 1109, and 1111 to a display controller and display device 1117 and to peripheral devices such as input/output (I/O) devices which may be mice, keyboards, modems, network interfaces, printers and other devices which are well known in the art. Typically, the input/output devices 1115 are coupled to the system through input/output controllers 1113. The volatile RAM (Random Access Memory) 1109 is typically implemented as dynamic RAM (DRAM), which requires power continually in order to refresh or maintain the data in the memory.

The mass storage 1111 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1111 will also be a random access memory although this is not required. While FIG. 9 shows that the mass storage 1111 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1103 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "collecting," "computing," "summarizing," "forwarding," "retrieving," "checking," "allowing," "rejecting," "generating," "confirming," "constructing," "comparing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to generate a plurality of content briefs, the method comprising:
   receiving a strategy for generating the plurality of content briefs, wherein each of the plurality of content briefs is a structured document that is used to guide creation of content;
   collecting a collection of content;
   generating a plurality of content clusters by:
      generating features for the collection of content using unsupervised machine learning, wherein the generating involves a feedforward neural network comprising a probabilistic language model and an encoder, the encoder acting as a conditional summary, the encoder comprising an encoder function implementing an attention-based model; and clustering the content collection using the generated features and the received strategy; and generating the plurality of content briefs from the plurality of content clusters.

2. The non-transitory machine-readable medium of claim 1, further comprising:

generating a tone of voice for each of the plurality of content briefs, wherein the tone of voice for a content brief is a style to be used for a voice of the content brief.

3. The non-transitory machine-readable medium of claim 1, further comprising:

generating an intended audience for each of the plurality of content briefs, wherein the intended audience for a content brief is a type of audience that is a target for the content brief.

4. The non-transitory machine-readable medium of claim 3, wherein the intended audience is an advertising segment.

5. The non-transitory machine-readable medium of claim 1, further comprising:

generating a matching persona for each of the plurality of content briefs.

6. The non-transitory machine-readable medium of claim 1, further comprising:

generating a purpose for each of the plurality of content briefs, wherein the purpose for a content brief is type of purpose for the content brief.

7. The non-transitory machine-readable medium of claim 1, further comprising:

generating a set of one of more influencers for each of the plurality of content briefs, wherein an influencer for a content brief is a social media presence that would boost a presence for the content associated for that content brief.

8. The non-transitory machine-readable medium of claim 1, further comprising:

generating a set of one or more relevant sources for each of the plurality of content briefs, wherein a relevant source for a content brief is a content source to be used for the generation of the content associated with that content brief.

9. The non-transitory machine-readable medium of claim 1, further comprising:

generating a set of one or more potential questions for each of the plurality of content brief, wherein a potential question for a content brief is a question that is used by a content creator for generating the content associated with the content brief.

10. The non-transitory machine-readable medium of claim 1, wherein the strategy includes one or more information types of at least one of a content strategy, persona strategy, and channel strategy.

11. The non-transitory machine-readable medium of claim 1, further comprising:

computing one or more content brief characteristics for each of the plurality of content briefs.

12. The non-transitory machine-readable medium of claim 3, wherein a headline characteristic is selected from the group consisting of exclusivity, demand, and emotionality.

13. A method to generate a plurality of content briefs, the method comprising:

receiving a strategy for generating the plurality of content briefs, wherein each of the plurality of content briefs is a structured document that is used to guide creation of content;

collecting a collection of content;

generating a plurality of content clusters by:

generating features for the collection of content using unsupervised machine learning, wherein the generating involves a feedforward neural network comprising a probabilistic language model and an encoder, the encoder acting as a conditional summary, the encoder comprising an encoder function implementing an attention-based model; and clustering the content collection using the generated features and the received strategy; and generating the plurality of content briefs from at least the plurality of content clusters.

14. The method of claim 13, further comprising:

generating a tone of voice for each of the plurality of content briefs, wherein the tone of voice for a content brief is a style to be used for a voice of the content brief.

15. The method of claim 13, further comprising:

generating an intended audience for each of the plurality of content briefs, wherein the intended audience for a content brief is a type of audience that is a target for the content brief.

16. The method of claim 13, further comprising:

generating a matching persona for each of the plurality of content briefs.

17. The method of claim 13, further comprising:

generating a purpose for each of the plurality of content briefs, wherein the purpose for a content brief is type of purpose for the content brief.

18. The method of claim 13, further comprising:

generating a set of one of more influencers for each of the plurality of content briefs, wherein an influencer for a content brief is a social media presence that would boost a presence for the content associated for that content brief.

19. The method of claim 13, further comprising:

generating a set of one or more relevant sources for each of the plurality of content briefs, wherein a relevant source for a content brief is a content source to be used for the generation of the content associated with that content brief.

20. The method of claim 13, further comprising:

generating a set of one or more potential questions for each of the plurality of content brief, wherein a potential question for a content brief is a question that is used by a content creator for generating the content associated with the content brief.

* * * * *